March 22, 1960   I. RODRIGUEZ ET AL   2,929,477
NON-ELECTRIC MAGNETIC CLUTCH (TORQUE LIMITING)
Filed Dec. 23, 1957
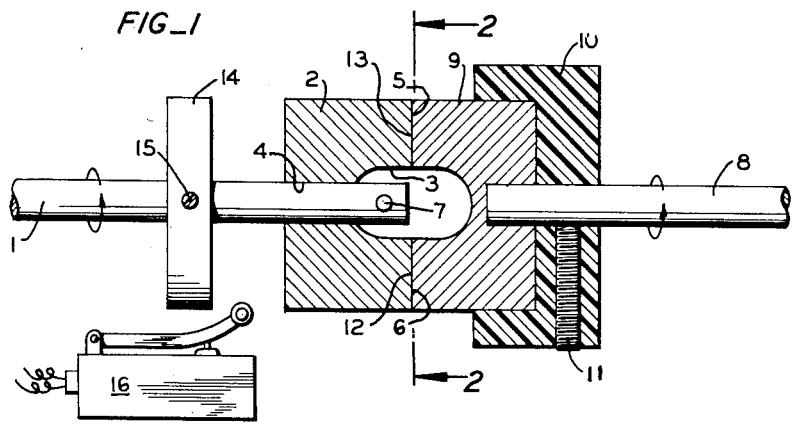
FIG_1
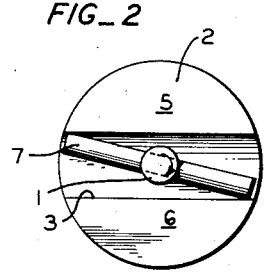
FIG_2
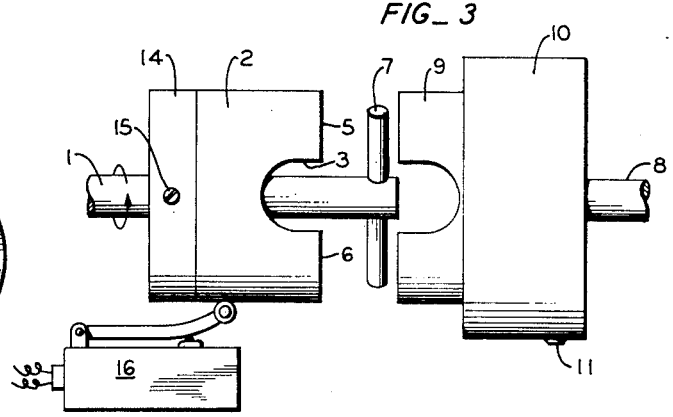
FIG_3
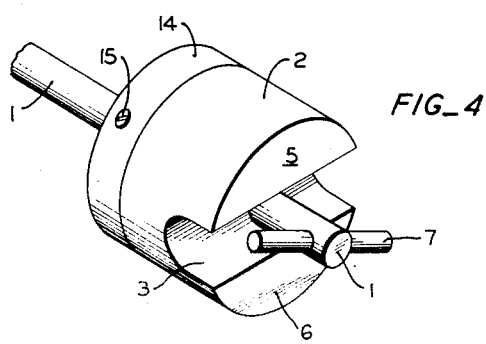
FIG_4
INVENTORS
IGNACIO RODRIGUEZ
MORTON G. BUTLER
BY United States Patent Office 2,929,477
Patented Mar. 22, 1960

2,929,477
NON-ELECTRIC MAGNETIC CLUTCH
(TORQUE LIMITING)

Ignacio Rodriguez, Los Angeles, and Morton G. Butler, Torrance, Calif., assignors to Servomechanisms, Inc., Hawthorne, Calif., a corporation of New York Application December 23, 1957, Serial No. 704,576

5 Claims. (Cl. 192—56)

Our invention relates to an apparatus for disengaging a driven shaft from its source of rotation when the torque upon the driven shaft exceeds a specified limit.

It is an object of our invention to provide an inexpensive apparatus with a minimum of parts to provide for the disengaging of a driven shaft from its source of rotation whenever the torque upon the driven shaft exceeds a specified amount.

It is a further object of our invention to provide a simple, inexpensive apparatus which may be used as a part of, or in conjunction with, more expensive apparatus to prevent damage to such more expensive apparatus by overloading.

It is another object of our invention to provide a simple, inexpensive apparatus which may be used in or in conjunction with a driven apparatus to provide for the cessation of operation of the driven apparatus when a predetermined load limit has been reached.

Our invention will be best understood by reference to the following description in connection with the accompanying drawings of a selected embodiment of the apparatus.

In the drawings:

Figure 1 is a longitudinal sectional view of a selected embodiment of the apparatus described in the specification;

Figure 2 is a cross-sectional view along the line 2—2 in Figure 1;

Figure 3 is an elevational view of the apparatus showing the elements in disengaged position; and Figure 4 is a perspective view of a portion of the apparatus.

The selected embodiment of the apparatus comprises a rotatable steel driving shaft 1 upon which there is mounted a round U-type magnet 2. The two legs of the U of the magnet form a keyway 3 and a bore 4 is provided through the magnet 2 to serve as a bearing. The magnet 2 is axially shiftable and freely rotatable on the shaft 1, as by means of the bore 4 extending through the magnet 2.

The two ends of the legs of U-shaped magnet 2 form the north pole 5 and the south pole 6 respectively, and the keyway 3 formed by the legs of the U embraces an aluminum pin 7 mounted in driving shaft 1 perpendicular thereto and near the free end of the shaft. The pin 7 acts as a key to prevent rotation of the magnet 2 upon shaft 1 when the pin 7 and the keyway 3 and magnet 2 are embraced.

A steel driven shaft 8 is placed in axial alignment with driving shaft 1 and a round U-type magnet 9 is mounted in an aluminum holding cup 10. Holding cup 10 is fixed upon the driven shaft 9 by a steel set screw 11. The two ends of the legs of magnet 9 form the north pole 12 and the south pole 13 of magnet 9.

Magnets 2 and 9 are of the same size and shape and are normally aligned face to face with the north pole 5 of magnet 2 in engagement with the south pole 13 of magnet 9, and with the south pole 6 of magnet 2 in engagement with the north pole 12 of magnet 9.

It will become apparent that if the two shafts 1 and 8 are radially displaced so that the magnets become radially displaced from their normal operating position, that the north pole 5 of magnet 2 and the north pole 12 of magnet 9 will face each other and that the south pole 6 of magnet 2 and the south pole 13 of magnet 9 will face each other, thus tending to repel the magnet 2 away from magnet 9 and out of engagement with pin 7.

Means are provided to limit the out of engagement axial movement of the magnet 2 and to hold the magnet out of engagement with the magnet 9. As illustrated, these means comprise a steel collar 14 having the same diameter as the magnet 2 and being adjustably secured to shaft 1 by means of set screw 15. A limit switch 16, such as for example the switch of U.S. Letters Patent 1,960,020 is mounted in operative relationship with magnet 2 so that electrical contact may be made or broken, as desired, upon axial shifting of the magnet 2.

In the operation of the illustrative device, magnets 2 and 9 are first manually engaged so that the north pole 5 and south pole 6 of magnet 2 engage the opposite poles on magnet 9. Driving shaft 1 is rotated by appropriate means. When driving shaft 1 is rotated, driving pin 9 causes magnet 2 also to rotate. Magnet 2, being engaged with magnet 9, causes magnet 9 also to rotate thus causing driven shaft 8 to rotate. The magnetic force holding together magnets 2 and 9 has a predetermined torque load limit determinable by the strength of the magnets.

When the torque load limit for which the device is designed is exceeded, the field between magnets 2 and 9 will shear and the pole faces of magnet 2 will shift position with respect to the pole faces on magnet 9. This will continue until north pole 5 of magnet 2 faces north pole 12 of magnet 9, and the south pole 6 of magnet 2 faces the south pole 13 of magnet 9. When the magnets are in this position, each will repel the other and magnet 2 will be repelled from magnet 9. At this moment, magnet 2 will disengage itself from driving pin 7 and it will slide axially until it is stopped by collar 14 and actuate switch 16. Since only magnetic force is used to turn driven magnet 9, the force of drive upon driven shaft 8 will have been released. The switch may optionally be used to cut off the source of power to driving shaft 1 or to operate indicating means signalling that the torque load has been exceeded. The collar 14 acts as a keeper for the magnet 2 and tends to maintain the clutch in disengagement.

The clutch means may now be reengaged manually at the option of the operator, and the foregoing procedure may be repeated.

Having thus described a selected embodiment of the invention, it will become apparent to those skilled in the art that other modifications may be made upon the specific embodiment disclosed above upon an understanding of the foregoing specification. Accordingly, the scope of the invention is defined in the appended claims.

We claim:

1. A magnetic torque limiting clutch including an input shaft; an output shaft in axial alignment with said input shaft; magnetic means comprising two magnetized members; one of said magnetized members being securely fastened to one of said shafts; means mounting said other of said magnetized members upon said other shaft so that said other magnetized member is axially shiftable upon said other shaft from a first position to a second position, so that it is nonrotatable upon said other shaft in its first shiftable position and so that it is rotatable upon said other shaft in its second shiftable position; said shafts and magnetized members being constructed and arranged so that at its first axial shiftable position said other magnetized member is in magnetic contact with said first magnetized member and so that at its second axial shiftable position said other magnetized member is out of magnetic contact with said first magnetized member; a driving pin arranged on said other shaft and cooperating with said other of said magnetized members to restrain said other of said magnetized members from rotation upon said other shaft and to cause said other magnet to rotate with said other shaft when said other of said magnetized members is in its first shiftable position; said magnetic means being adapted and arranged to transmit driving force from the input shaft to the output shaft solely through the magnetic field between the two permanently magnetized members when said magnetized members are in contact with one another and to shear said magnetic field between said two magnetized members whenever a predetermined torque load is impressed across said clutch whereby said other magnetized member is repelled from the first magnetized member whenever said predetermined torque load is impressed across said clutch.

2. A magnetic torque limiting clutch including an input shaft; an output shaft in axial alignment with said input shaft; magnetic means comprising two magnetized members; one of said magnetized members being securely fastened to one of said shafts; means mounting said other of said magnetized members upon said other shaft so that said other magnetized member is axially shiftable upon said other shaft from a first position to a second position, so that it is nonrotatable upon said other shaft in its first shiftable position and so that it is rotatable upon said other shaft in its second shiftable position; said shafts and magnetized members being constructed and arranged so that at its first axial shiftable position said other magnetized member is in magnetic contact with said first magnetized member and so that at its second axial shiftable position said other magnetized member is out of magnetic contact with said first magnetized member; means cooperating with said other of said magnetized members to restrain said other of said magnetized members from rotation upon said shaft and to cause said other magnet to rotate with said other shaft when said other of said magnetized members is in its first shiftable position; said magnetic means being adapted and arranged to transmit driving force from the input shaft to the output shaft solely through the magnetic field between the two permanently magnetized members when said magnetized members are in contact with one another and to shear said magnetic field between said two magnetized members whenever a predetermined torque load is impressed across said clutch whereby said other magnetized member is repelled from the first magnetized member whenever said predetermined torque load is impressed across said clutch.

3. A magnetic torque limiting clutch including an input shaft; a noutput shaft in axial alignment with said input shaft; and magnetic means comprising two magnetized members; one of said magnetized members being securely fastened to one of said shafts; means mounting said other of said magnetized members upon said other shaft so that said other magnetized member is axially shiftable upon said other shaft from a first position to a second position, so that it is nonrotatable upon said other shaft in its first shiftable position and so that it is rotatable upon said other shaft in its second shiftable position; said shafts and magnetized members being constructed and arranged so that at its first axial shiftable position said other magnetized member is in magnetic contact with said first magnetized member and so that at its second axial shiftable position said other magnetized member is out of magnetic contact with said first magnetized member; said magnetic means being adapted and arranged to transmit driving force from the input shaft to the output shaft solely through the magnetic field between the two permanently magnetized members when said magnetized members are in contact with one another and to shear said magnetic field between said two magnetized members whenever a predetermined torque load is impressed across said clutch whereby said other magnetized member is repelled from the first magnetized member whenever said predetermined torque load is impressed across said clutch.

4. A magnetic torque limiting clutch including an input shaft; an output shaft; and magnetic means comprising two magnetized members; one of said magnetized members being securely fastened to one of said shafts; and means mounting said other of said magnetized members upon sraid other shaft so that said other magnetized member is axially shiftable upon said other shaft from a first position to a second position, so that it is nonrotatable upon said other shaft in its first shiftable position and so that it is rotatable upon said other shaft in its second shiftable position; said shafts and magnetized members being constructed and arranged so that at its first axial shiftable position said other magnetized member is in magnetic contact with said first magnetized member; and so that at its second axial shiftable position said other magnetized member is out of magnetic contact with said first magnetized member; said magnetic means being adapted and arranged to transmit driving force from the input shaft to the output shaft solely through the magnetic field between the two permanently magnetized members when said magnetized members are in contact with one another and to shear said magnetic field between said two magnetized members whenever a predetermined torque load is impressed across said clutch whereby said other magnetized member is repelled from the first magnetized member whenever said predetermined torque load is impressed across said clutch.

5. A magnetic torque limiting clutch including an input shaft; an output shaft; magnetic means comprising two magnetized members; means mounting one of said magnetized members upon one of said shafts so that said magnetized member is axially shiftable upon said shaft from a first position to a second position, is nonrotatable upon said shaft in its first shiftable position and is rotatable upon said shaft in its second shiftable position; said shafts and magnetized members being constructed and arranged so that when the axially shiftable magnetic member is at its first axial shiftable position said magnetized members are in magnetic contact with one another; and so that when the axially shiftable magnetic member is at its second axial shiftable position said magnetized members are out of magnetic contact with each other, said magnetic means being adapted and arranged to transmit driving force from the input shaft to the output shaft solely through the magnetic field between the two permanently magnetized members when said magnetized members are in contact with one another and to shear said magnetic field between said two magnetized members whenever a predetermined torque load is impressed across said clutch whereby said other magnetized member is repelled from the first magnetized member whenever said predetermined torque load is impressed across said clutch.

References Cited in the file of this patent

UNITED STATES PATENTS

| | | |
|---|---|---|
| 1,118,683 | Rindfleisch | Nov. 24, 1914 |
| 1,887,216 | Reynolds | Nov. 8, 1932 |
| 1,988,413 | Bing | Jan. 15, 1935 |

FOREIGN PATENTS

| | | |
|---|---|---|
| 311,916 | Switzerland | Feb. 15, 1956 |